United States Patent [19]

Hiramatsu

[11] Patent Number: 4,506,563
[45] Date of Patent: Mar. 26, 1985

[54] HYDRAULIC CONTROL SYSTEM FOR AUTOMATIC TRANSMISSION GEAR

[75] Inventor: Takeo Hiramatsu, Kyoto, Japan

[73] Assignee: Mitsubishi Jidosha Kogyo Kabushiki Kaisha, Tokyo, Japan

[21] Appl. No.: 421,311

[22] Filed: Sep. 22, 1982

[30] Foreign Application Priority Data

Sep. 29, 1981 [JP] Japan .................. 56-154266

[51] Int. Cl.³ .................. B60K 41/04; F16H 3/74
[52] U.S. Cl. .................. 74/867; 74/866; 74/868; 74/752 A; 74/752 C
[58] Field of Search .................. 74/762, 763, 866, 867, 74/868, 869, 752 A, 752 C; 192/0.08, 3.58

[56] References Cited

U.S. PATENT DOCUMENTS

| | | | |
|---|---|---|---|
| 3,756,358 | 9/1973 | Espenschied et al. | 192/3.58 X |
| 3,935,793 | 2/1976 | Murakami | 74/868 X |
| 4,125,038 | 11/1978 | Hiramatsu | 74/869 |
| 4,224,837 | 9/1980 | Croswhite | 74/763 X |
| 4,228,700 | 10/1980 | Espenschied et al. | 74/866 |
| 4,346,626 | 8/1982 | Kawamoto | 74/869 X |
| 4,361,060 | 11/1982 | Smyth | 74/866 |
| 4,367,528 | 1/1983 | Kawamoto et al. | 74/866 X |
| 4,420,994 | 12/1983 | Muller et al. | 74/867 |

FOREIGN PATENT DOCUMENTS

| | | |
|---|---|---|
| 2333099 | 1/1975 | Fed. Rep. of Germany ........ 74/867 |
| 2428649 | 1/1975 | Fed. Rep. of Germany ........ 74/867 |
| 55-142151 | 11/1980 | Japan ................................. 74/868 |

*Primary Examiner*—Lawrence J. Staab
*Assistant Examiner*—Arthur T. Quiray

[57] ABSTRACT

In an automatic transmission gear of 4-speed advance type comprising at least 3 pairs of clutches including a friction clutch which hydraulically connects an input shaft and the carrier of Ravigneaux type planet wheel gears for the 4th speed, 2 pairs of brakes and one pair of oneway clutches, it is required to engage two pairs of clutches in order to shift the speed to the 3rd speed while it is necessary to engage another pair of clutches with one pair of brakes for the 4th speed, thereby presenting difficulties in setting transmission timings and an initial engagement torque. The hydraulic control system for an automatic transmission gear according to the present invention is capable of smooth transmission without causing transmission shocks and of improving the durability of clutches and brakes because in the system one pair of clutches is made to engage for the 4th speed in advance after completion of the 3rd speed shifting.

4 Claims, 14 Drawing Figures

| select lever & auxiliary switch | | P | R | N | D4 | | | | D3 | | | 2 | | L | |
|---|---|---|---|---|---|---|---|---|---|---|---|---|---|---|---|
| shifting gear | | — | R | — | 1st | 2nd | 3rd | 4th | 1st | 2nd | 3rd | 1st | 2nd | 1st | 2nd |
| friction engagement devices | front clutch 11 | ◯ | | | | | ◯ | | | | ◯ | | | | |
| | rear clutch 12 | | | | ◯ | ◯ | ◯ | | ◯ | ◯ | ◯ | ◯ | ◯ | ◯ | ◯ |
| | kick down brake 14 | | | | | ◯ | | ◯ | | ◯ | | | ◯ | | ◯ |
| | low reverse brake 15 | ◯ | ◯ | | | | | | | | | ◯ | | ◯ | |
| | one way clutch 16 | | | | ◉ | | | | ◉ | | | ◉ | | | |
| | 4th speed clutch 13 | | | | | | | ◯ | | | ◯ | | | | |
| | transmission ratio | — | 2.176 | — | 2.846 | 1.581 | 1.000 | 0.685 | 2.846 | 1.581 | 1.000 | 2.846 | 1.581 | 2.846 | 1.581 |

HYDRAULIC CONTROL SYSTEM FOR AUTOMATIC TRANSMISSION GEAR

BACKGROUND OF THE INVENTION

The present invention relates to an improvement of the hydraulic control system for an automatic transmission gear to prevent shocks frequently caused when the mechanism is shifted to the 4th speed.

Various types of automatic transmission gears have been used to drive a secondary mover while keeping the output torque and the revolution rate of the prime mover in an internal combustion engine or the like at predetermined values. Hydraulic control systems are often used for controlling such automatic transmission gears.

Hydraulic control systems are used for controlling the automatic transmission gears in an automobile. In an automatic transmission gear of 4-speed advance type comprising 3 pairs of clutches including a friction clutch which is hydraulically driven to connect an input shaft with a carrier of Ravigneawx type planet wheel gears for the 4th speed, 2 pairs of brakes and one pair of oneway clutches, it is necessary to engage 2 pairs of clutches for the 3rd speed whereas for the 4th speed it is necessary to engage one pair of brakes with the friction clutch which is different from the one for the 3rd speed. It therefore is extremely difficult to set the timings for releasing the 2 pairs of clutches which have been engaged for the 3rd speed and newly engaging friction clutch with one pair of brakes for the 4th speed as well as to set the initial engagement torque, thereby causing transmission shocks or affecting the durability or the strength of clutches, brakes, etc.

OUTLINE OF THE INVENTION

The present invention aims at providing a hydraulic control system for an automatic transmission gear which is capable of preventing transmission shocks and which is improved in the durability and the strength of frictional engagement elements. In order to achieve such objects, the hydraulic control system according to the present invention comprising at least 3 pairs of clutches including a friction clutch which is hydraulically operated to connect an input shaft with a carrier of Ravigneawx type planet wheel gear for the 4th speed, 2 pairs of brakes and one pair of oneway clutch is characterized in the construction comprising a revolutional rate detection device to detect the synchronization in revolution between the said input shaft and the said carrier at the time of shifting from the 2nd to the 3rd speed, a switch valve which is switched on by the increase in oil pressure supplied to a pair of clutch connected for the said 3rd speed to start hydraulic supply to the said friction clutch, and a hydraulic control means which controls the oil pressure supplied to the said one pair of clutches during the shift from the 2nd to the 3rd speed at a low value and which also increases the said oil pressure at the detection of the said synchronization with the detection signal from the said revolution rate detection device.

DETAILED DESCRIPTION OF AN EMBODIMENT OF THE INVENTION

The present invention will now be described in detail referring to an embodiment shown in the attached drawings.

Figures 1, 2:
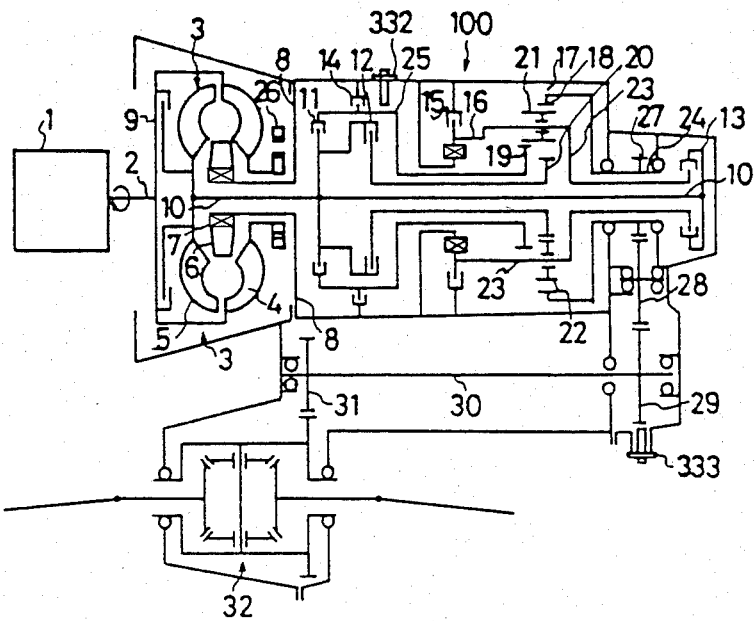
FIG. 1 shows the power train of an automatic transmission gear for vehices which is an object of application of the present invention.
FIG. 2 is a table of elements of the said automatic transmission gear to explain the engagment among frictional devices by the position of the select lever.

The automatic transmission which is the object of control will be first explained referring to the power train chart in FIG. 1.

The crank shaft 2 of an engine which is the power source of the vehicle is directly connected to a pump 4 of a torque converter 3. The torque converter 3 includes the pump 4, a turbine 5, a stator 6 and a oneway clutch 7 and the stator 6 is connected to a case 8 via the oneway clutch 7 and is allowed to rotate in the same direction as the crank shaft 2 by the oneway clutch 7 but is prohibited to rotate in the opposite direction. Between the crank shaft 2 and the turbine 5 there is provided a direct coupling clutch 9 which is engaged directly at a predetermined slip ratio at the time of engagement.

The output of the engine 1 is therefore transmitted to the turbine 5 either via the direct coupling clutch 9 or the torque converter 3.

The torque transmitted to the turbine 5 is further transmitted by an input shaft to a transmission gear row 100 for 4 speeds-in-advance and one-speed-in-reverse which is provided behind of the shaft.

The transmission gear row 100 comprises 3 pairs of clutches 11, 12 and 13, 2 pairs of brakes 14 and 15, one pair of oneway clutches 16 and one pair of Ravigneawx type planet wheel gears 17.

The planet (wheel) gears 17 comprises an annulus gear 18, a reverse sun gear 19, a forward sun gear 20, a long pinion 21, a short pinion 22 and a carrier 23.

The annulus gear 18 is fixed on an output shaft 24, and the reverse sun gear 19 is fixed on a kick-down drum 25 which is in turn fixed on the case 8 via a kick-down brake 14 and which is integrated with the input shaft 10 via the front clutch 11. The forward sun gear 20 on the other hand is integrated with the input shaft 10 via the rear clutch 12. The carrier 23 holding the long pinion 21 and the short pinion 22 is fixed on the case 8 via the oneway clutch 16 as well as is integrated with the input shaft 10 via the 4th speed clutch 13 mounted on the rear end of the transmission gear row 100 and further is fixed on the case 8 via a low reverse brake 15. The oneway clutch 16 is provided in order to prevent reversal rotation of the carrier 23.

The above mentioned 3 pairs of clutches 11, 12, 13 and the 2 pairs of brakes 14, 15 are hydraulic type friction engagement devices and the hydraulic pressure to be supplied to respective hydraulic pistons which operate such friction type engagement devices is produced by an oil pump 26.

The output transmitted through the transmission gear row 100 is further transmitted from a transfer drive gear 27 fixedly mounted on the output shaft 24 to a transfer driven gear 29 via a transfer idle gear 28 and further to a differential gear 32 via a transfer shaft 30 which is integral with the driven gear 29 and a helical gear 31.

The above mentioned friction engagement devices are selectively engaged to achieve various speeds depending on the driving conditions of the vehicle detected from the operation of the select lever at the drivers seat (not shown), and the auxiliary switches to select $D_4$, $D_3$, 2 or L and by various driving detection devices which will be explained hereinafter.

Selectable patterns are P (for parking), R (for reverse), N (for neutral), $D_4$ (for driving forward by 4 speed automatic transmission gear), $D_3$ (for driving forward 3 automatic transmission gear) and L (for one fixed speed). Select lever can be geared to 4 positions of P., R., N., and D. It is so arranged that if the lever is geared to the position D, and if the auxiliary switch comprising an inhibitor switch and a switch is selected, either one of the patterns, L., 2, $D_3$ or $D_4$ can be selected.

FIG. 2 indicates the elements by the manner of engagements among such frictional engagement devices when the select lever and the auxiliary switch are placed at respective positions in the selectable patterns. The transmission ratio of 4 speeds in advance and one speed in reverse can be thus obtained by the selective combination of the frictional engagement devices shown in FIG. 2.

In the figure the mark ○ denotes the frictional engagement devices at the state of engagement made by the hydraulic operation, the mark ⊛ denotes the state where a carrier 23 is suspended by the operation of the oneway clutch 16 immediately before the low reverse brake 15 is engaged at the time of transmission. The "1st", "2nd", "3rd" and "4th" in the columns of $D_4$, $D_3$, 2 and L of the select lever and auxiliary switch denote that the transmission gear is shifted to the 1st, 2nd, 3rd and 4th speed.

As is obvious from the figure, in order to shift in the 3rd speed, it is necessary to connect the front clutch 11 and the rear clutch 12 while in order to achieve the 4th speed, it is necessary to engage the kick-down brake 14 with the 4th speed clutch 13 which are different from the above mentioned two pairs of the clutches 11 and 12.

Figure 3:
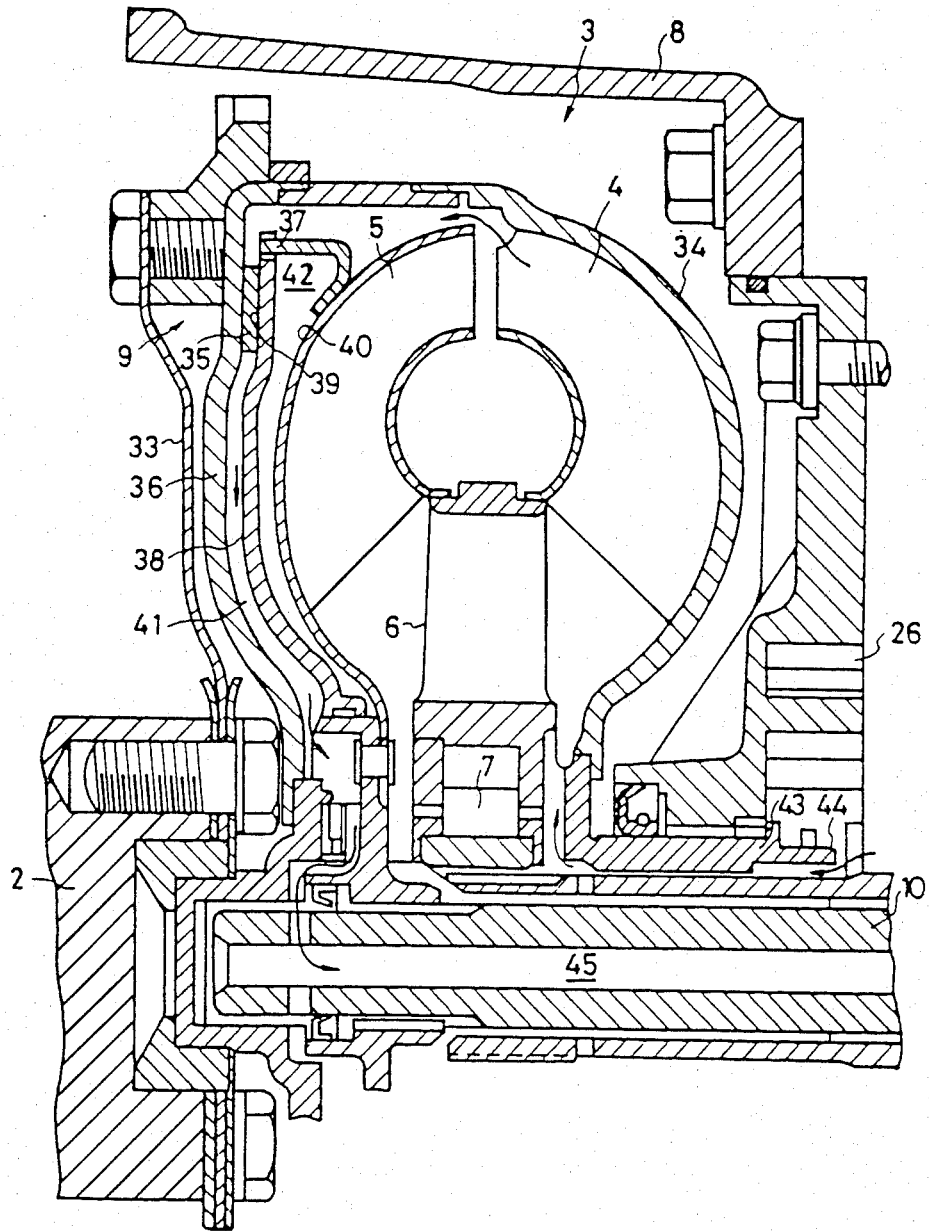
FIG. 3 is a cross section of a torque converter and a direct coupling clutch.

Referring to FIG. 3 the direct coupling clutch 9 will now be described.

The direct coupling clutch 9 is a clutch of slip type which transmits power by constantly sliding and when this clutch 9 is operated, the power from the engine 1 is mainly transmitted to the input shaft 10 via the clutch 9 and only a part of the power is transmitted via the torque converter 3 so as to reduce the slip on the torque converter 3 for better fuel economy. The slip conveniently has a damping effect (force) to reduce the shock torque from the engine 1.

The torque converter 3 and the direct coupling clutch 9 are formed integrally and a drive plate 33 is fixed on a crank shaft 2. The drive plate 33 is connected to the outer case 34 of the pump 4 of the torque converter 3 as well as to a plate 36 on which a friction plate 35 of the direct coupling clutch 9 is fixed. The turbine 5 is engaged with spline into the input shaft 10 so as to integrally rotate therewith and is simultaneously connected to the piston 38 via a transfer ring 37 so as to integrally rotate therewith. The piston 38 is engaged with the input shaft 10 in a manner freely slidable as well as rotatable in the direction of the shaft and is arranged to oppose the plate 36. It also includes a friction surface 39 to abut with the friction plate 35. An oil pressure chamber 41 is formed between the piston 38 and the plate 36 while an oil pressure chamber 42 is formed between the outer preference of an outer case 40 of the turbine 5 and the piston 38.

The coefficients of Kinetic friction of the friction plate 35 and the friction face 39 of the said direct coupling clutch 9 are designed to have a small rate of change by the speed difference.

Grooves in a suitable plural number are provided on the surface of the said friction plate 35 in the direction along the radius, circumference or the combination thereof so that the oil flowing through the grooves may prevent overheat on the friction plate 35 and the friction surface 39.

The oil supplied to the said torque converter 3 and the direct coupling clutch 9 is conditioned by the oil pressure control mechanism which will be described hereinafter. The oil is directed from the oil pass 44 formed inside of the sleeve 43 which is engaged from outside over the input shaft 10 of the pump 4 into the torque converter 3 for circulation, as shown by the arrow mark in FIG. 3, and further to the oil pressure chamber 42 and then is made to pass through the slit between the friction plate 35 and the friction surface 39 into the oil pressure chamber 41. The oil then is either exhausted from the oil pass 45 projected from the input shaft 10 or is circulated in the reverse direction.

Figure 4:
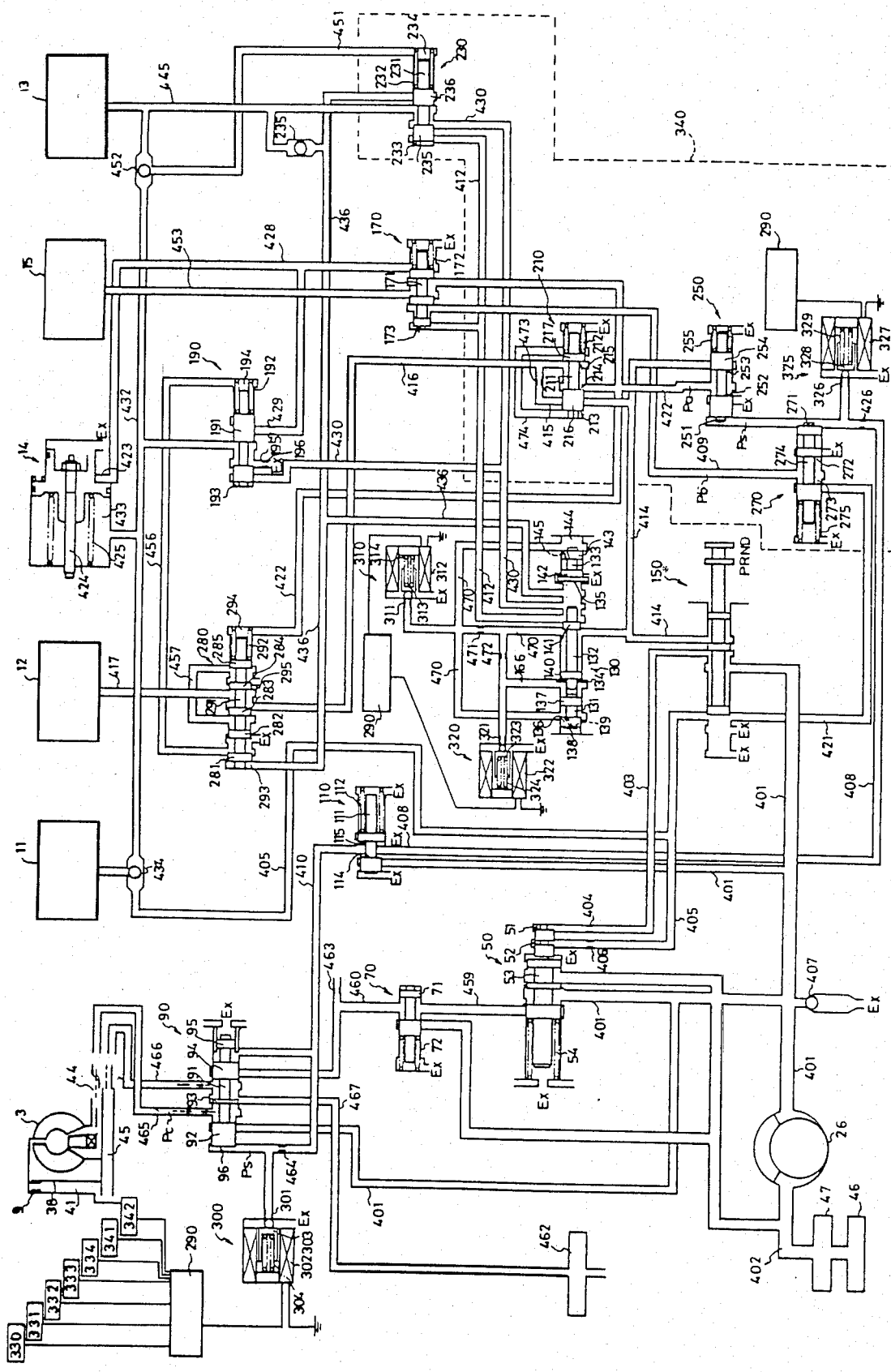
FIG. 4 shows the system of a hydraulic control system for the said automatic gears provided with a 4-speed clutch oil pressure control mechanism which is an embodiment of the present invention.

Referring to FIG. 4, explanation will now be made on the oil pressure control device which controls respective friction engagement devices of the said automatic transmission gear and the oil pressure control device for a 4th speed clutch to be applied therefor.

The oil pressure control device is to control depending on driving conditions the pressure of the oil which is discharged from an oil pump 46 via an oil filter 47, an oil pass 402 and an oil pump 26 and which is supplied to each oil pressure chambers to operate the torque converter 3, the direct coupling clutch 9, the front clutch 11, the rear clutch 12, the kick-down brake 14, the low reverse brake 15 and the oil pressure piston of the 4th-speed clutch. The device mainly comprises a pressure control valve 50, a torque converter control valve 70, a direct coupling clutch control valve 90, a reducing valve 110, a shift control valve 130, a mannual valve 150, a 1st-2nd speed shift valve 170, a 2nd-3rd speed and 4th-3rd speed shift valve 190, a N-D control valve 210, a 4th-speed clutch control valve 230 as a switch valve, an oil pressure control valve 250 for the time of shifting gear, a N-R control valve 270, a rear clutch control valve 280 and four solenoid valves 300, 310, 320 and 325. Among those valves, the N-D control valve 210, the 4th-speed clutch control valve 230, the oil pressure control valve 250, the N-D control valve 270 and the solenoid valve 325 compose the oil pressure control device 340 of the 4th speed clutch 13 which is encircled with the broken line in FIG. 4, respective elements thereof being connected by oil passes.

The solenoid valves 300, 310, 320 and 325 having identical constructions are the solenoid valves of the type which are closed when they are not electrically alive. They are made to open/close orifices 301, 311, 321 and 326 with electric signal from the electronic control system 290, including solenoids 302, 312, 322 and 327, valve bodies 303, 313, 323 and 328 to open/close orifices 301, 311, 321 and 326 placed inside the said solenoids and springs 304, 314, 324 and 329 to energize the said bodies to close direction.

The electronic control device 290 houses a transmission detection device to detect the start of the gear shifting, detects the driving conditions of the vehicles to start/stop the solenoid valves 300 and 325 which conduct duty-control, controls the oil pressure by changing the time to open valves through controlling the amplitude in single pulse current of several to several tens Hz e.g. 50 Hz supplied to the said solenoid valves, and controls to open/close the solenoid valves 310, 320 which conducts ON/OFF control. On the input side thereof, there are arranged an engine load detection device 330 which detects the opening of the throttle valve (not shown) of the engine on the negative pressure of an intake manifold, a revolution rate detection device 331 of the engine 1, a revolution rate detection device 332 for the kick-down drum 25 shown in FIG. 1, a revolution rate detection device 333 for the transfer driven gear 29 provided for the revolution rate detection of the output shaft 24, an oil temperature detection device 334 for the temperature of lubricant oil, a selective position detection device 341 for the select lever and a selective position detection device 342 for the auxiliary switch.

The oil exhausted from the oil pump 26 is directed through the oil pass 401 to the pressure control valve 50, the manual valve 150, the direct coupling clutch control valve 90 and the reducing valve 110.

The pressure control valve 50 includes a spool 53 and a spring 54 having the pressure receiving surfaces 51 and 52. The oil pressure of the oil pass 401 is exerted on the pressure receiving surface 51 via the manual valve 150, the oil pass 403 and the orifice 404 when the manual valve 150 is selectively positioned either at the position N or the position D by operating the select lever, thereby controlling the oil pressure in the oil pass 401 at a constant value of 6 Kg/cm$^2$. (This pressure is referred to as the line pressure.) The oil pressure of the oil pass 401 is exerted on the pressure receiving surface 52 via the manual valve 150, the oil pass 405 and the orifice 406 when the manual valve 150 is positioned at the position R, thereby controlling the pressure in the oil pass 401 at a constant value of 14.6 Kg/cm$^2$. A relief valve provided in the pass 401 is an escape valve for the time high pressure oil is discharged from the oil pump 26.

The oil directed to the reducing valve 110 via the oil pass 401 is controlled with the valve 110 to be 2.4 Kg/cm$^2$ before being lead into the oil passes 408 and 410. The reducing valve 110 has a spool 111 and a spring 112 to control the pressure with the balance between the oil pressure determined by the difference in space between the pressure receiving surfaces 114 and 115 opposingly provided on the spool and the spring 112.

The pressure control oil directed into the oil pass 408 is the oil to be used on the side of the control with a predetermined pressure for the oil pressure control device of 4th speed clutch 340. The oil is lead from an orifice 426 to the control side of the oil pressure control valve 250, the control side of the N-R control valve 270 and the orifice 326 of the solenoid valve 325 and, when the solenoid valve 325 controlled by the electronic control device 290 is activated, changes the control pressure in the downstream of the orifice 426 in the oil pass 408 to produce the output pressure suitable for the particular driving condition at the time of shifting either in the oil pass 422 or in the oil pass 409.

Various valves composing the 4th speed clutch in the oil pressure control device will be described below.

The N-D control valve 210 has a spool 211 having two lands 216, 217 of different diameters and a spring 212. The valve switches the spool 211 either to the left position shown in FIG. 4 or to the right position (not shown) depending on the direction of resultant vector of the oil pressure exerted on the pressure receiving surfaces 213, 214 on both sides of the land 216 and the pressure receiving surface 215 of land 217 on the side of the land 216 and the energizing force on the spring 212.

The 4th speed clutch control valve 230 has a spool 231 having two lands 235, 236 and a spring 232 and an oil pressure chamber 233 is provided on the left side of the land 235 of the spool 231 to direct the line pressure therein while an oil pressure chamber 234 is provided on the right side of the land 236. The spool 231 therefore can be selectively switched either to the left position shown in FIG. 4 or to the right position (not shown).

The oil pressure control valve 250 has a spool having pressure receiving surfaces 251, 252 and 253 and a spring 255 and the oil pressure in the oil pass 422 can be controlled at a predetermined value by the balance between the oil pressure exerted on the surface 251 and the combined force of the oil pressure determined by the difference in space between the surfaces 252 and 253 and of the energizing force on the spring 255.

The N-R control valve 270 has a spool 274 having pressure receiving surfaces 271, 272 and 273 and a spring 275 and the oil pressure in the oil pass 409 is controlled at a predetermined value by the balance between the oil pressure exerted on the surface 271 and the combined force of the oil pressure determined by the difference in space between the surfaces 272 and 273 and the energizing force on the spring 275.

The said oil pressure control valve 250 and the N-R control valve 270 are so structured that when either one is conducting the pressure control, the other one is not to conduct such control, thereby working as an accumulator to absorb the pulsation in the control pressure in downstream of the orifice 426 of the oil pass 408 with the effects of the springs 255 or 275 and of the oil pressure from the surfaces 251 or 271. The output pressure directed into the oil pass 422 controls the rear clutch 12, kick-down brake 14 and low reverse brake 15 at the time of advance while the oil pressure directed to the oil pass 409 controls the low reverse brake 15 at the time of reversing.

The solenoid valve 325 receives signals from the engine load detection device 330, the revolution rate detection device 333 and the oil temperature detection device 334 to detect the driving condition by the electronic control device 290 and controls the time to open/close the orifice 326 by changing the pulse width in the duty-control or several to several tens of Hz, for instance of 50 Hz depending on the condition detected. The control pressure $P_s$ which is exerted either on the surface 251 of the oil pressure control valve or the surface 271 of the N-R control valve 270 is controlled by the solenoid valve 325 to be about 0.3-2.1 Kg/cm$^2$ when the orifice 426 is set at 0.8 in diameter and the orifice 326 at 1.4 in diameter.

Figure 5:
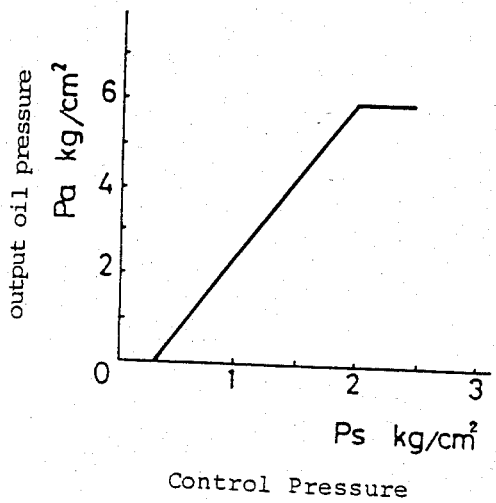
FIGS. 5 and 6 are the graphs to show the relation between the control pressure $P_s$ and the output pressue $P_a$ at the time of advance and the output pressure $P_b$ at the time of reverse in the hydraulic pressure control system of the 4th speed clutch.
Figure 6:
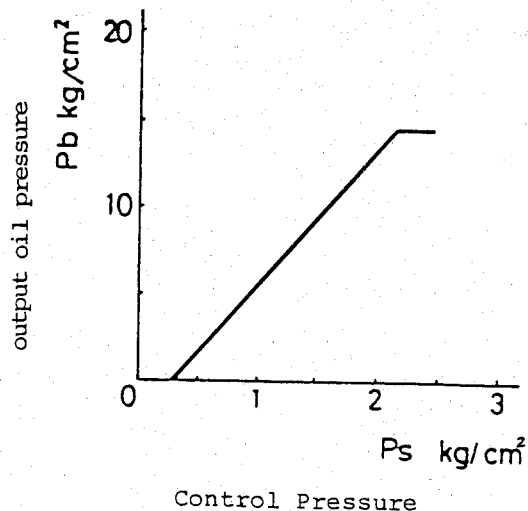

At the oil pressure control valve 250 when the pressure of 6 Kg/cm$^2$ in the line pressure supplied by the control oil pressure $P_s$ from the oil pass 414 is output to the oil pass 422 as an output pressure $P_a$, it is controlled to be 0 to 6 kg/cm$^2$ as shown in FIG. 5. At the N-R control valve 270 on the other hand, when the line pressure of 14.6 kg/cm$^2$ supplied from the oil pass 421 by the control pressure $P_s$ is output from the oil pass 409 as an output pressure $P_b$, it is controlled to be 0 to 14.6 kg/cm$^2$ as shown in FIG. 6.

The start and the operation period of the solenoid valve 325 are determined by the signals from the said various detection devices 330, 333, 334 as well as from the transmission detection device housed within the electronic control device 290 to detect the start of the transmission, and the engagement time detection device comprising two revolution rate detection devices 332 and 333.

The shift control valve 130 is controlled by the combination of the open/close of the two solenoid valves 310 and 320 which are ON-OFF controlled to obtain gear shiftings for 4 speeds-in-advance. The shift control valve 130 has spools which are divided into three, 131, 132 and 133 are 2 stoppers 134 and 135. The spool 131 is provided with two lands 136 and 137 and with an oil hole communicating the oil pressure chamber 138 outside of the land 136 to the lands 136 and 137. The spool 132 is provided with two lands 140 and 141 having different diameters as well as with pressure members on both ends thereof to abut on the spools 131 and 133. The spool 133 is provided with two lands 142, 143 as well as with an oil hole 145 communicating the oil pressure chamber 144 outside of the land 143 to the lands 142, 143. A stopper 134 is interposed between the spool 131 and the spool 132 to form a hole through which the pressure member on the end of the spool 132 penetrates to be fixed on the casing while a stopper 135 is interposed between the spool 132 and the spool 133 to form a hole through which the pressure member on the end of the spool 132 penetrates to be fixed on the casing.

The oil pass 470 which constantly connect the two lands 140, 141 of the spool 132 communicates with the oil pass 414 of the manual valve 150 as well as with the orifice 311 via the orifice 471 which is opened/closed by the solenoid valve 310 and further with the oil pressure chamber 138, 144. The oil pass 470 communicates with the orifice 321 via the orifice 472 which is opened/closed by the solenoid valve 320 as well as with the spools 131, 132 under the state shown in FIG. 4. They control 3 spools 131, 132, 133 by opening or closing the two solenoid valves 310, 320 so as to obtain 1st to 4th speeds. The relation between the open/close of the solenoid valves 310, 320 and respective shifts is shown in Table 1.

TABLE 1

|  | Solenoid Valve 310 | Solenoid Valve 320 |
| --- | --- | --- |
| 1st | o | o |
| 2nd | x | o |
| 3rd | x | x |
| 4th | o | x |

The 1st-2nd speed shift valve 170 has a spool 171 and a spring 172 to switch the spool 171 either to the left position shown in FIG. 4 or to the right position (not shown) by comparing the pressure force 173 in the line pressure exerted on the surface on the left side of the spool 171 with the energizing force of the spring 172.

The 2nd-3rd speed and 4th-3rd speed shift valve 190 has a spool 191 and a spring 192 and is provided with an oil pressure chamber 194 on the left side of the spool to direct line pressure therein while it is provided with an oil pressure chamber 194 to selectively switch respective spools to either the left position shown in FIG. 4 or to the right position (not shown).

The rear clutch control valve 280 has a spool 291 having 5 lands 281, 282, 283, 284 and 285 and a spring 292 and the diameter of the land 281 is slightly larger than that of the land 285. The spool 291 is selectively switched either to the left position shown in FIG. 4 or to the right position (not shown) by the balance among the force exerted on the surface of the land 281 by the oil pressure directed to the oil pressure chamber 293 outside the land 281, the force exerted on the surface of the land 285 by the oil pressure directed to the chamber 294 outside the land 285 and the energizing force on the spring 292.

The transmission by the selective engagement of respective friction engagement devices will now be explained below as well as the effect on the oil pressure control device and the 4th speed clutch oil pressure control device 340.

When the manual valve 150 is switched from N to D as shown in FIG. 4, the line pressure conditioned at 6 kg/cm$^2$ is directed from the oil pass 401 to the oil pass 414. The line pressure in the oil pass 414 is then directed to flow to the oil pressure chamber of the rear clutch 12 via the oil pressure control valve 250, the oil pass 422, the N-D control valve 210, the oil pass 416, the rear clutch control valve 280, and the oil pass 417 and simultaneously to flow to the oil pressure chamber of the low reverse brake 15 via the oil pass 422, the 1st-2nd speed shift valve 170 and the oil pass 453, thereby engaging the rear clutch 12 with the low reverse brake 15 for shifting into the 1st speed. During such shifting operation, the oil pressure to be supplied to the rear clutch 12 is controlled with the oil pressure control valve 250 of the oil pressure control device 340 for the 4th speed clutch so as to prevent shock. More particularly, when the start of speed shifting is detected by the transmission detection device housed in an electronic control system 290 such as a computer, the controlled pressure $P_s$ downstream of the orifice 426 in the oil pass 408 is conditioned by the duty control of the solenoid valve 325 which is controlled by the electronic control device 290 to vary the output pressure $P_a$ which is to be output from the oil pass 414 to the pass 422. By the above mentioned maneuver, drastic rise in the oil pressure in the chamber of the rear clutch 12 is prevented to alleviate shock which might otherwise be caused at the time of transmission. The spool 274 of the N-R control valve 270 communicating to the oil pass 408 in the downstream of the orifice 426 of the pass 408 concurrently works as an accumulator with the pressure receiving surface 271 and the spring 275 to absorb the pulsation in the controlled oil pressure $P_s$.

Figure 7:
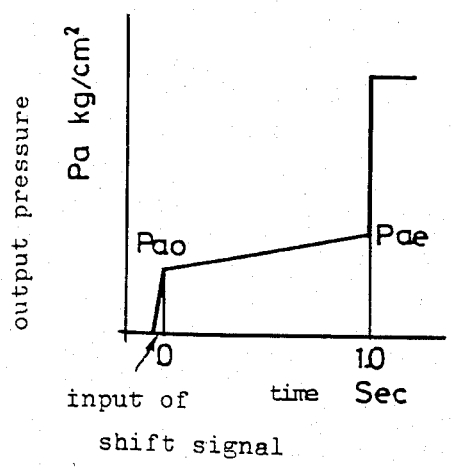
FIGS. 7 to 10 are the graphs to show the characteristics of the hydraulic pressure control device for the 4th speed clutch in respect of the time and the revolution rate of engine.
Figure 8:
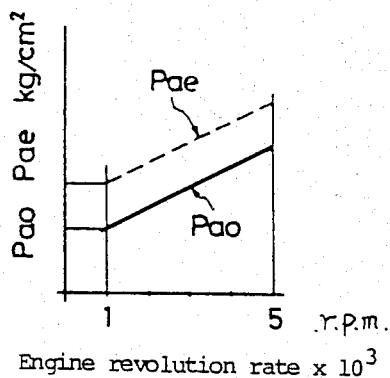

FIGS. 7 and 8 indicate the characteristics of the output oil pressure $P_a$ from the oil pass 422 which is controlled by the control valve 250 at the time of rise in respect of time and engine revolution rate. In the figure, $P_{ao}$ denotes the output oil pressure at the start of the shifting and $P_{ae}$ the output oil pressure at the completion of the shifting.

The operation of the N-D control valve 210 will now be explained. When the oil pressure is directed from the oil pass 422 to between the two lands 216, 217, the force determined by the difference in space between the surface 214 and the surface 215 overcomes the energizing force on the spring 212 to press the spool 211 to the right direction in FIG. 4. As a result the communication between the oil pass 422 and the oil pass 416 is cut off and the oil pass 414 is newly made to communicate with the oil pass 415 with the orifice 473 interposed therebetween while the oil pass 414 is made to communicate with the oil pass 474.

As far as the manual valve 150 is kept at the position D, the oil pass 414 is made to communicate with the oil pass 416 without passing through the control valve 250 and the oil pressure chamber of the rear clutch 12 is therefore free of the effect of pressure reducing control by the control valve 250 and the solenoid valve 325 at the time of shifting thereby preventing such problems as transmission shock and idling of the engine which might otherwise be caused by the slip of the rear clutch 12 at the time of transmission.

When the manual valve 150 is switched from N to D, the oil pressure is directed from the oil pass 414 to the shift control valve 130. At the time when the 1st speed is geared in where the solenoid valves 310, 320 are both alive to open the orifices 311, 321, the oil pressure is made to substantially be 0 kg/cm² by the interposal of orifices 471, 472 downstream thereof. The spool 132 is pressed toward the left direction by the force determined by the difference in space between the surface of the land 140 and that of the land 141 in the high oil pressure generated thereon to reach and stay at the leftmost position shown in FIG. 4.

As the speed of the car is accelerated by moving the accelerator pedal further, the electronic control device 290 sends out a command to achieve the 2nd speed to the solenoid valves 310 and 320, thereby making the solenoid valve 310 electrically dead while keeping the solenoid valve 320 alive.

By this switch, the high pressure oil in the oil pass 470 is directed via the orifice 471 to between the two lands 136, 137 of the spool 131, the oil hole 139, the oil pressure chambers 138, 144 and between the two lands 142, 143 of the spool 133 to move the spool 131 integrally with the spool 132 to the right direction and stops when the spool 131 abuts on the stopper 134. Then the line pressure in the oil pass 414 is directed through between the two lands 140, 141 of the spool 132 into the oil pass 412 to work on the oil pressure chamber 173 of the 1st-2nd speed shift valve 170 so that the spool 171 moves to the rightmost position shown in FIG. 4. The line pressure simultaneously works on the oil pressure chamber 233 of the 4th speed clutch control valve 230 to move the spool 231 to the rightmost position shown in FIG. 4. At the 1st-2nd shift valve 170, the line pressure which has been directed into the oil pass 422 is supplied to the oil pressure chamber 423 on the engaging side of the kick-down brake via the oil pass 428 to make the rod 424 overcome the spring 425 to move to the left direction, thereby engaging the brake band (not shown) with the kick-down drum 25. The oil pressure in the oil pass 453, on the other hand, is discharged from the oil pass 409 which is connected to the N-R control valve 270, thereby releasing the engagement of the low reverse brake 15 for the 2nd speed shift.

During such shifting, the oil pressure control valve 250 is still controlled by the oil pressure of the solenoid 325 to reduce the oil pressure in the oil pass 422 to prevent the transmission shock.

When electricity is cut off at the solenoid valves 310 and 320 in order to achieve 3rd speed with the command from the electronic control device 290, the line pressure is supplied to between the outside of the land 137 of the spool 131 in the shift control valve 130 and the stopper 134 to move the spool 132 to the right direction shown in FIG. 4 with the line pressure exerted on the surface of the stopper 134 until it abuts on the spool 133 and stops there. The oil pass 414 is newly made to communicate with the oil pass 430 so as to direct the line pressure to the oil pressure chamber 193 of the 2nd-3rd speed and 4th-3rd speed shift valve 190 to switch the spool 191 thereof to the right position.

The oil pass 428 connecting to the said shift valve 190 is at the same time made to communicate with the oil pass 432 via the orifice 429. The oil pass 432 is therefore connected to the oil pressure chamber 234 on the right side of the 4th speed clutch control valve 230 via the switch valve 452 as well as to the oil pressure chamber of the front clutch 11 via the oil pressure chamber 433 on the release side of the kick-down brake 14 and the switch valve 434.

Since the oil pass 432 is communicated with the oil pressure chamber 433 on the release side of the kick-down brake 14 as well as with the oil pressure chamber of the front clutch 11, engagement and release between aforementioned two can be conducted in a overlapping manner.

During this shifting from the 2nd to the 3rd speed, similarly to the shifting from the 1st to the 2nd speed, the oil pressure control valve 250 controls effectively to keep the supply oil pressure in the oil pass 422 at a low value for a short time. As the orifice 429 is interposed in the oil pass 428, the oil pressure in the oil pressure chamber of the front clutch 11 and in the oil pressure chamber 433 are maintained at the same low value while the oil pressure control valve 250 is being at work, thereby conducting engagement of the front clutch concurrently with the release of the kick-down brake 14. When the oil pressure rises to 6 kg/cm² subsequently as the oil pressure control valve 250 stops operation, the engagement of the front clutch 11 is completed to finish the 3rd speed shifting. When the 3rd speed shifting is completed, the revolution rate of the input shaft 10 and that of the kick-down drum 25 comes to approach to the revolution rate of the output shaft 24 and ultimately synchronizes therewith. Such synchronized state or immediately before the synchronization is detected by the revolution rate detection devices 332, 333 as the completion of the speed shifting. With this detection the oil pressure control valve stops operation and the supply pressure to the front clutch 11 is increased to 6 kg/cm². By this increase in pressure the oil pressure in the chamber 234 of the right position of the 4th speed clutch control valve 230 is also increased, the spool 231 is switched to the left position in FIG. 4, the line pressure in the oil pass 430 is supplied to the 4th speed clutch 13 via the oil pass 445 and the 4th speed clutch is kept engaged. As the oil pass 445 is connected to the oil pressure chamber 234 via the switch valve 452 and the oil pass 451, once the oil pressure is supplied into the oil pass 445, the spool 231 of the 4th speed clutch control valve 230 is kept at the left position shown in FIG. 4 until the time the oil pressure is discharged from the oil pass 445, thereby preventing incapability of shifting or neutral position which might otherwise be caused by release of slippage of the 4th speed clutch 13 during the shifting from 3rd to 4th speed.

When the auxiliary switch $D_4$ is selected, the solenoid valve 310 is kept alive while the solenoid valve 320 is made dead with the command from the electronic control device 290 for the 4th speed, the oil pressure in the oil pressure chamber 144 of the shift control valve 130 is reduced to move the spool 133 as well as the spool 132 to the right direction to reach the rightmost position shown in FIG. 4. As a result the line pressure in the oil pass 414 is directed to the oil pressure chamber 293 of the rear clutch control valve 280 via the pass 436 and to the oil pass 445 via the check valve 235.

The spool 291 of the rear clutch control valve 280 is moved to the right direction shown in FIG. 4 by the line pressure supplied to the oil pressure chamber 293 so as to connect the oil pass 436 with the oil pass 456 and to supply the line pressure to the oil pressure chamber 194 of the 4th-3rd speed shift valve 190, thereby switching the spool 191 of the said valve 190 to the left position shown in FIG. 4.

At that time the oil in the oil pressure chamber of the rear clutch 12 is immediately discharged from the oil outlet 295 of the rear clutch control valve 280 to immediately release the rear clutch 12 while the oil in the oil pressure chamber 433 of the kick-down brake 14 as well as in the oil pressure chamber of the front clutch 11 is discharged from the oil outlet 195 of the 2nd-3rd speed and 4th-3rd speed shift valve 190 via the orifice 196 to release the front clutch 11 as well as to engage the kick-down brake 14. Since the oil pressure control valve 250 operated in a manner similar to the shifting from 1st to 2nd or 2nd to 3rd speed to reduce the oil pressure in the oil pass 422 for a short time, the engagement oil pressure exerted in the oil pressure chamber 423 of the kick-down brake 14 is reduced to carry out smooth engagement. Then shifting to 4th speed is completed as the pressure rises to 6 kg/cm² and the engagement is completed.

It is arranged that the revolution rate detection devices 332 and 333 can detect that the input shaft 10 and Ravigneawx type planet wheel carrier 23 are synchronized in revolution under the state where front clutch 11 is engaged after the shift from 2nd to 3rd speed is completed, in order to prepare the 4th speed clutch for engagement, it is capable of avoiding shocks which might be caused by the difficulty in setting the initial engagement torque and is advantageous in durability and strength of the 4th speed clutch 13.

When the speed is to be shifted down, switching of the oil pressure in the operation system should be reversal to the above shifting-up operation; when both solenoid valves 310, 320 are made dead with the command from the electronic control device 290 in order to shift the speed from the 4th to the 3rd, the line pressure in the oil pass 436 is discharged, the spool 291 of the rear clutch control valve 280 is switched to the left end, the spool 191 of the 2nd-3rd speed and 4th-3rd speed shift valve 190 is switched to the left end and the oil pressure is supplied to the oil passes 417 and 432.

The oil is smoothly supplied to the oil pressure chamber 433 of the kick-down brake 14 and the oil pressure chamber of the front clutch 11 via the orifice 429. The oil is gradually supplied to the oil pressure chamber of the rear clutch 12 with enough delay compared with the front clutch 11. Although the kick-down brake 14 therefore is immediately released, the oil pressure control valve 250 is operated for a short time during shifting to maintain the supply pressure to the oil passes 428, 432 at a low value.

This maneuver is carried out in order to prevent shock which might be caused by the engagement from the rear clutch 12 with a large torque capacity.

When the speed is shifted from 3rd to 2nd, the solenoid valve 310 is made electrically dead while the solenoid valve 320 is made alive, the oil pressure between the spools 131 and 132 of the shift control valve 130 is reduced, the spool 132 is moved by one step toward left direction to discharge the oil pressure from the oil pass 430, thereby moving the spool 191 of the 2nd-3rd speed and 4th-3rd speed shift valve 190 to the left end. This makes the oil pressure in the oil pass 432 discharged, the spool 231 of the 4th speed clutch control valve 230 move toward left end to discharge the oil pressure from the oil pass 445 as well as to immediately release the engagement of the 4th speed clutch 13. The release of the engagement of the front clutch 11 and the engagement of the kick-down brake 14 are conducted gradually by the operation of the oil pressure control valve 250 in a manner similar to the shifting from 4th to 3rd speed for smooth shifting into the 2nd speed.

When the gear is shifted from 2nd to 1st speed, the solenoid valves 310 and 320 are both made alive, at the shift control valve 130 the spools 131, 132 are moved to the leftmost position, and the oil pressure is discharged from the oil pass 412, thereby moving the spool 171 of the 1st-2nd speed shift valve 170 and the spool 321 of the 4th speed clutch control valve 230 toward left direction. The oil in the chamber of the kick-down brake 14 is further discharged to release the engagement of the brake 14 and at the same time the low reverse brake 15 is made engaged to achieve the 1st speed.

When the position $D_3$ or 2 is selected by maneuvering the select lever and the auxiliary switch, no pass is switched by the manual valve 150 and the position thereof is detected by the selected position detection device 341 of the select lever and the selected position detection device 342 of the auxiliary switch to give signal to the electronic control device 290 and to control the solenoid valves 310 and 320 so that shifting to 4th or 3rd speed should not be conducted.

When the manual valve 150 is selected to be the position L, the selected position detection device 341 of the select lever detects the position so as to maintain the speed at the 2nd speed if the speed of the car is at or over a predetermined value such as 50 Km/H at initial stage of selection, and if the speed of the car becomes less than the predetermined value, to fix the speed at the 1st speed with the control by the solenoid valves 310, 320.

As described above, the supply oil pressure during shifting is maintained at a low value in order to prevent shock.

Mechanism for driving the car in reverse direction will be described below.

When the manual valve 150 is selected to be at the position R, the oil pass 401 is communicated with the oil pass 421, the oil pass 421 is lead to the low reverse brake 15 via the N-R control valve 270, the oil pass 409, the 1st-2nd speed shift valve 170, and the oil pass 453 while the oil pass 401 is connected to the switch valve 434 via the oil pass 405, thereby supplying the oil to the oil pressure chamber of the front clutch 11 to engage the clutch 11 with the brake 15 for driving the car in the reverse direction.

Figure 9:
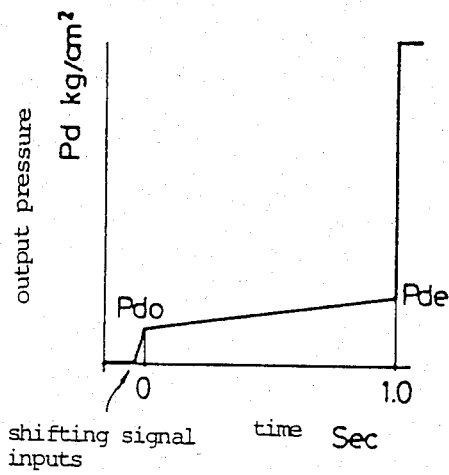
Figure 10:
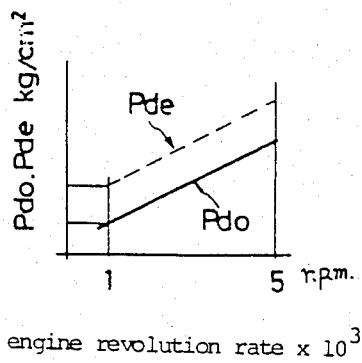

Even during the shifting to reverse direction, the N-R control valve 270 operates as an oil pressure adjusting valve while the spool 254 of the oil pressure control valve 250 and the spring 255 function as accumulators for absorbing pulsation to vary the output pressure $P_d$ from the pass 409 as shown in FIGS. 9 and 10.

The oil which has been directed from the oil pass 459 to the torque converter control valve 70 via the pressure adjustment valve is controlled to be 2.5 kg/cm$^2$ with the balance between the control pressure exerted on the right end surface of the spool 71 and the energizing force on the spring 72 to be directed into the direct coupling clutch control valve 90 via the oil pass 460. The oil in the oil pass 460 is supplied to the lubricating system provided on the side opposing to the engine 1 via the orifice 463.

Figure 11:
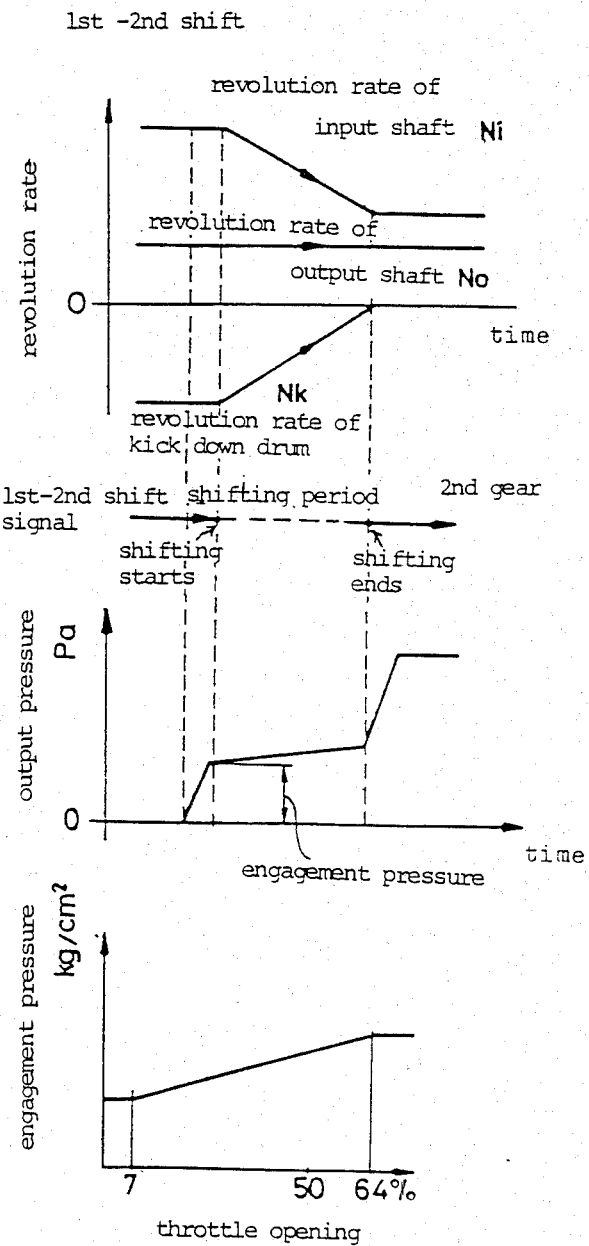
FIGS. 11 to 13 are the graph to show the characteristics of the hydraulic pressure control system at respective upward shifting and FIG. 14 is the graph to indicate the hydraulic pressure characteristics of the direct coupling clutch type control valve.
Figure 12:
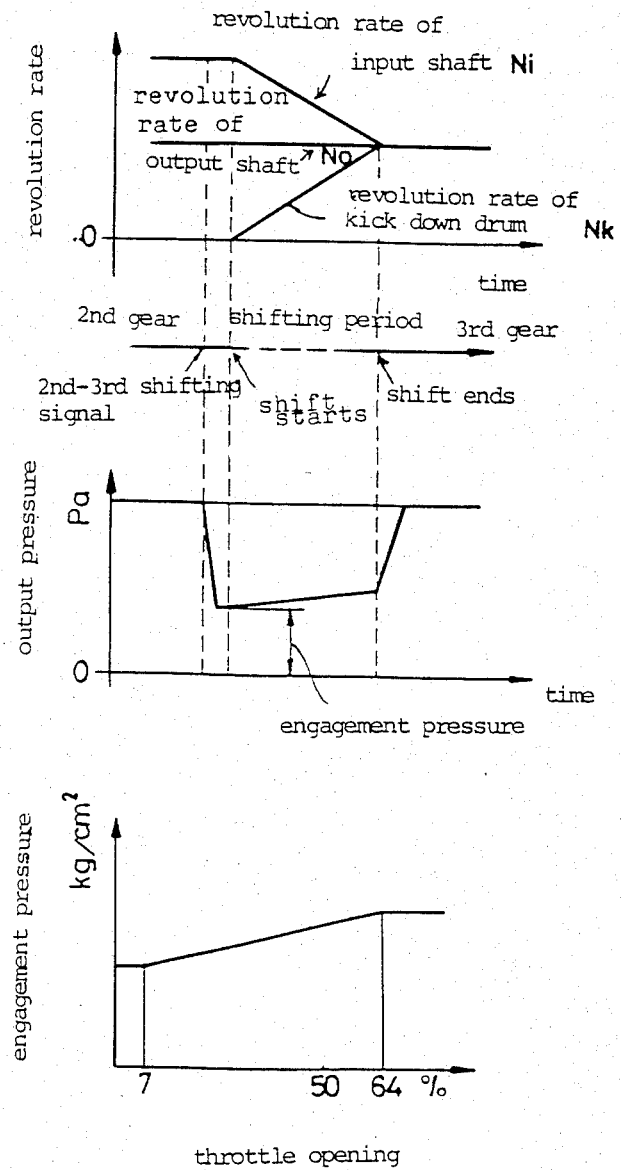
Figure 13:
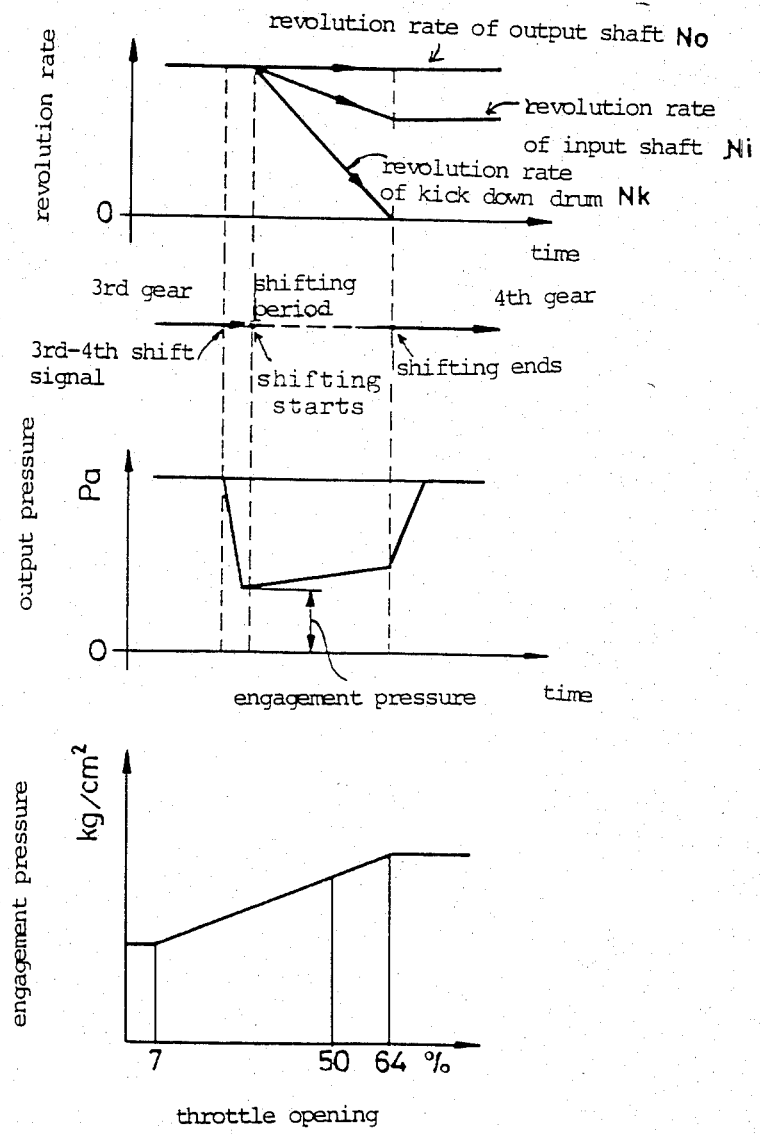

Examples of the oil pressure control characteristics of the oil pressure control device mentioned above for shifting up and down are indicated in FIGS. 11 to 13.

FIGS. 11 through 13 relate to the shifting up of an ordinary type or the shifting from 1st to 2nd speed, 2nd to 3rd speed, 3rd to 4th speed wherein $N_i$ denotes a revolution rate of the input shaft, $N_\alpha$ an output shaft revolution rate, $N_k$ a revolution rate of kick-down drum and $P_a$ an output oil pressure.

The control on the direct couple clutch 9 which is provided to reduce slipping within the torque converter 3 will now be described.

The oil which has been conditioned to be 2.4 kg/cm$^2$ by the reducing valve 110 and lead into the oil pass 410 is directed into the orifice 301 via the orifice 464 which is controlled to open or close by the solenoid valve 300.

The direct coupling clutch control valve 90 has a spool 91 having 4 lands 92, 93, 94 and 95. The control oil pressure adjusted by the duty control with the solenoid valve 300 in the range between 0.3 to 1.9 kg/cm$^2$ is made to exert on the surface 96 outside the land 92. As the oil pass 410 on the other hand, communicates to between the lands 94 and 95, the oil pressure adjusted by the reducing valve 110 works on the lands 94, 95 to exert the pressure determined by the difference in space therebetween on the spool 91 toward left direction. The surface of the land 92 is designed smaller than that of the land 93. The direction of the oil flow to the torque converter 3 and the direct coupling clutch 9 and the oil pressure therefor are controlled depending on the balance between the pressure determined by the oil pressure exerted on the said surface 96 toward right direction and by the oil pressure between the lands 94, 95 and the pressure toward the right direction in FIG. 4 determined by the oil pressure between the lands 92, 93. The oil pass 44 subsequent to the torque converter 3 is connected with the oil pass 465 while the oil pass 45 subsequent to the direct coupling clutch 9 is connected with the oil pass 466. The oil pass 465 is switched from the supply oil pass 401 or the oil cooler 462 to be selectively communicated with the exhaust oil pass 467 which is connected to the lubrication system on the side of the engine 1 while the oil pass 466 is selectively communicated to either the supply oil pass 460 or the exhaust oil pass 467.

When the solenoid valve 300 is given a command from the electronic control device 290 for engaging with the direct coupling clutch 9, as shown by an arrow mark of the solid line in FIG. 4, the oil which has been adjusted by the direct clutch control valve 90 is supplied from the oil pass 401 into the pass 465 wherein the piston 38 is pushed to left direction by the oil pressure exerted in the oil pressure chamber 42 so that the direct coupling clutch 9 comes to be engaged still having a predetermined amount of slip.

Figure 14:
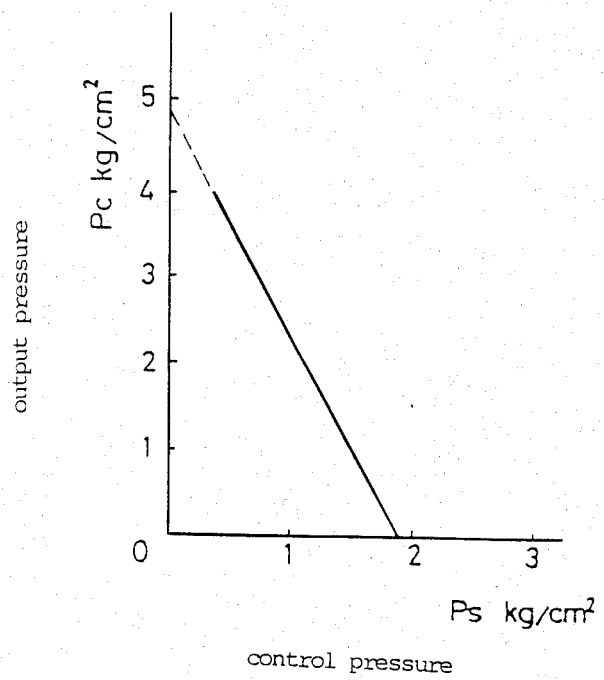

The hydraulic characteristics at the direct coupling clutch control valve 90 is indicated in FIG. 14. The output oil pressure $P_c$ generated in the oil pass 465 has the relation shown in the graph against the control oil pressure $P_s$ exerted on the surface 96 of the spool 91.

The oil pressure exerted on the piston 38 is controlled by a computer to have an amount of slip which is slightly below the speed range of the crank shaft 2 variable by the variable torque of the engine 1. Then the variable torque in the crank shaft 2 will not substantially be transmitted, attaining a high efficiency in power transmission as well as in fuel economy. At the time of the start or acceleration, however, the characteristics of the torque converter 3 should preferably be used for comforts, necessitating the disengagement of the direct coupling clutch 9. At such a time electricity is cut at the solenoid valve 300 by the electronic control device 290 to switch the direct coupling clutch control valve 90, thereby making the oil flow in a direction opposite to the above or the one indicated by an arrow mark of broken lines. More particularly, the oil pressure as low as 2.5 kg/cm$^2$ is supplied by the torque converter control valve 70 from the oil pass 460 to the pass 466 so that the piston 38 is pushed to right direction by the oil pressure exerted on the oil pressure chamber 41, thereby disengaging the direct coupling clutch 9.

As specifically described in the foregoing referring to an embodiment, the present invention is capable of conducting a smooth transmission and provides higher durability and strength in the 4th speed clutch because the clutch is made to be engaged only after the completion of the engagement of the front clutch. Therefore, this invention could avoid such difficulties as transmission shock which is often caused in conventional systems where oil pressure for engagement is simultaneously supplied to the front clutch 11 and the 4th speed clutch 13 and where it is extremely difficult to set initial engagement torque because engagement timings for the above two clutches vary depending on occassions.

I claim:

1. A hydraulic control system for an automatic transmission of a four forward speed type including at least three clutches which are hydraulically controlled by hydraulic oil and two brakes which are hydraulically controlled by hydraulic oil, one of said three clutches being a friction clutch which is engaged to attain a third speed ratio, another of said three clutches being a friction clutch disconnectably connecting an input shaft to a carrier of a planetary gearing of Ravigneawx type and which is engaged to attain a fourth speed ratio, said hydraulic control system comprising rotation speed detecting means for detecting synchronous rotation between said input shaft and said carrier, hydraulic oil pressure control means for controlling the pressure of hydraulic oil so that hydraulic oil at a predetermined reduced pressure is supplied to said third-speed attaining friction clutch during a shift from a second speed ratio to the third speed ratio and the pressure of hydraulic oil supplied to said third-speed attaining friction clutch is increased when said rotation speed detecting means detects synchronous rotation of said input shaft and said carrier; and a directional control valve which is changed over from one position to another with a rise of the pressure of hydraulic oil supplied to said third-speed attaining friction clutch during the shift from the second speed ratio to the third speed ratio thereby permitting supply of hydraulic oil to said fourth-speed attaining friction clutch.

2. A hydraulic control system as claimed in claim 1, wherein said rotation speed detecting means includes two rotation speed detectors detecting the rotation speed of two rotary elements respectively selected from among a plurality of rotary elements constituting said planetary gearing of the Ravigneauwx type.

3. A hydraulic control system as claimed in claim 2, wherein said two rotary elements are a sun gear operating as a reaction element after attainment of the second speed ratio and an annulus gear coupled to an output shaft.

4. A hydraulic control system as claimed in claim 1, wherein said hydraulic oil pressure control means includes an oil pressure control valve disposed midway of a conduit connecting said three clutches and said two brakes to an oil pressure source for controlling the pressure of hydraulic oil supplied from said oil pressure source so as to change the pressure of hydraulic oil supplied to said clutches and brakes depending on the required level of the pressure of hydraulic oil used for the control, a flow restrictor disposed midway of a conduit portion connecting said oil pressure control valve to said oil pressure source, a solenoid controlled valve associated with a hydraulic oil discharge port formed in said conduit portion between said restrictor and said oil pressure control valve for openably closing said hydraulic oil discharge port thereby changing the pressure level of hydraulic oil used for the control, and an electronic control unit acting to intermittently energize said solenoid controlled valve during the shift from the second speed ratio to the third speed ratio but ceasing the intermittent energization of said solenoid controlled valve when said rotation speed detecting means detects synchronous rotation of said input shaft and said carrier.

\* \* \* \* \*